July 4, 1961 G. A. DEAN 2,990,886
FIRE INERTING SYSTEM
Filed Nov. 3, 1959

INVENTOR.
GEORGE A. DEAN
BY
Bierman + Bierman
ATTORNEY

United States Patent Office 2,990,886
Patented July 4, 1961

2,990,886
FIRE INERTING SYSTEM
George A. Dean, Kansas City, Mo., assignor to The Benson Mfg., Co., Kansas City, Mo., a corporation of Missouri
Filed Nov. 3, 1959, Ser. No. 850,641
27 Claims. (Cl. 169—6)

The present invention is directed to fire-inerting systems adapted for use in various applications, but particularly applicable to fuel-fed engines of aircraft, such as reciprocating, turboprop and turbojet engines.

In the case of a crash of aircraft, when a fire ensues, it is due primarily to the spillage of combustibles, such as liquid fuel, oil and hydraulic fluid, which come in contact with ignition sources. These sources are definite ignition zones in the engine, which are small in area and in quantity. A prior system has been developed for inerting these areas based on a water spray which is distributed to give simultaneous programmed coverage for a predetermined period of time. Water is well suited for this purpose because of its high heat of vaporization and low molecular weight. Relatively small quantities of water provide effective cooling and generate large volumes of steam, thus forming a protective blanket of steam generated on the hot surfaces and at the same time rapidly cooling the hot metal to safe temperatures.

The prior system was based upon the use of a gas under high pressure, such as nitrogen, requiring a cylinder of heavy metal adding substantially to the over-all weight of the system. Because of the shape and size of the cylinder it could not be fitted into any available space in the aircraft. The complete unit was bulky and added substantially to the weight of the aircraft. It could not be located in the most desirable places because of its size, which limited its usefulness.

The present invention is intended and adapted to overcome the disadvantages inherent in fire-inerting systems of the prior art, it being among the objects thereof to provide a system of the type described which is light in weight, and which may be fabricated in a variety of shapes so as to be capable of fitting into available spaces adjacent to the engines of aircraft.

It is also among the objects of the invention to provide such a system in which the temperatures and pressures involved are relatively low, and one in which accidental activation by heat, radio frequency, vibration, shock, absorption or other factors, cannot occur.

It is further among the objects of the invention to provide a fire-inerting system which requires no external power to operate, the activation of which is initiated by the pilot, and which continues automatically to operate until the cycle is completed.

It is still further among the objects of the invention to provide a system having flexibility and which may be altered without any major structural changes to suit particular conditions, such as installing additional lines.

In practicing the invention, as applied to a turbojet type of engine having a compressor and a turbine which are to be fire-inerted, there is provided a container or tank of metal, which may be in various forms adapted to fit adjacent to the engine and become an integral part thereof. Within this container is a bag of flexible material, nylon being suitable for the purpose, and the mechanism of the system is fitted into the bag, which is also substantially filled with water to be propelled into the engine for fire-inerting the same.

An essential feature of the new fire-inerting system is the use of a solid propellant which is a combustible charge adapted to be set off by an electrical system operable from the cockpit of the aircraft. The gases released by the combustion of the charge drive a pump immersed in the water, and which takes up water from within the bag and delivers it to a series of outlets located in the engine proper, at rates of flow and pressures regulated by a simple valve system. The gases of combustion, after driving the pump are introduced into the space between the container or tank and the bag, thereby exerting pressure tending to collapse the bag, providing a pressure head of water to feed the pump and to prevent cavitation effects. The several elements are submerged in the water in the inactive state. Usually, in addition to the water in the system, there is provided separately a source of a fire-extinguishing fluid, such as "Freon" which is a mixture of chloro-fluoro methanes, and means are provided whereby said fluid is injected into certain elements of the engine at a predetermined time in the cycle.

The present fire-inerting system is illustrated in the accompanying drawings and more fully described in the specification, in which drawings like reference characters indicate like parts and wherein FIG. 1 is a flow diagram illustrating the character of the system and the association of the various parts thereof;

Figure 1:
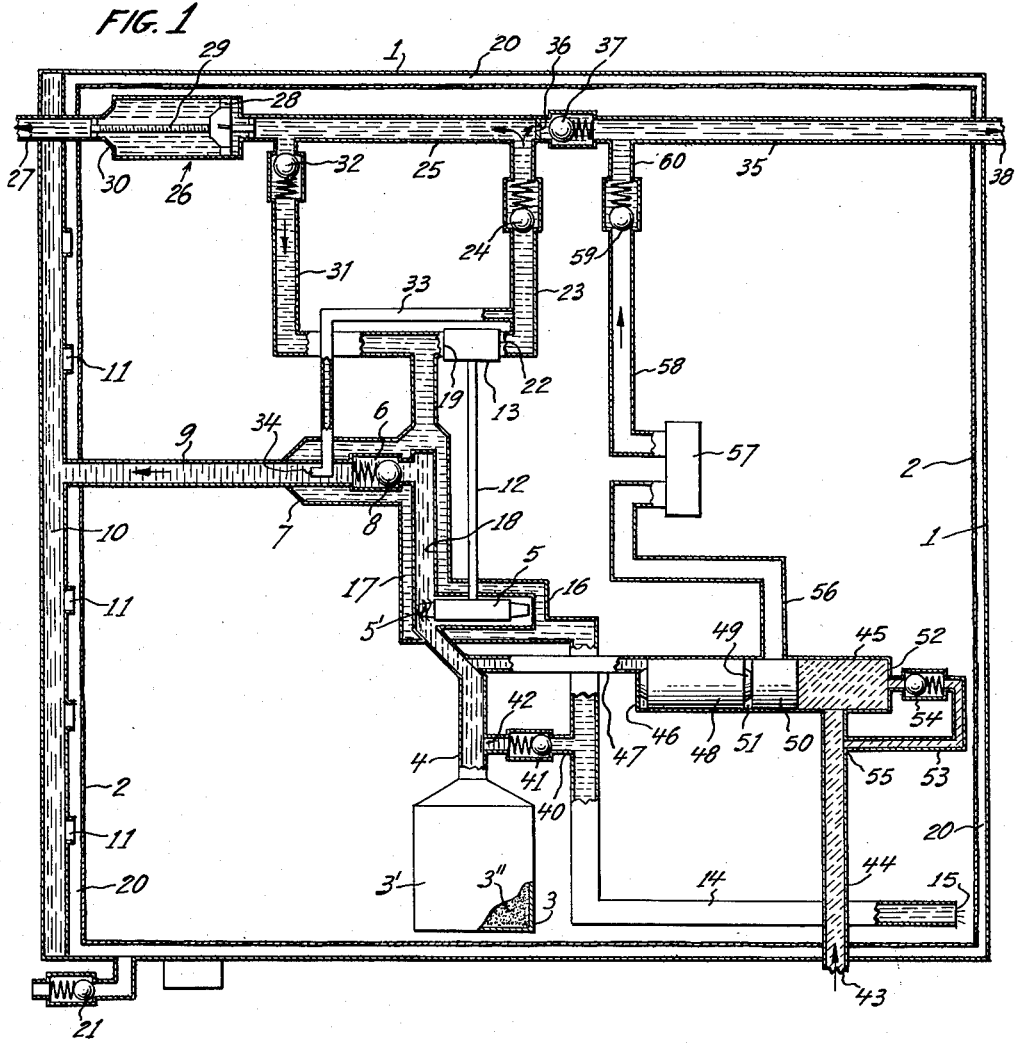

With reference particularly to FIG. 1 which is a schematic representation of the new system, there is provided a closed metal container 1 of a form adapted to fit into an available space. Within the container is a flexible bag 2, usually of a synthetic plastic material such as nylon, synthetic rubber or the like, which bag is impervious to gases and liquid, and is resistant to the temperatures developed in the system. All of the essential component parts of the system are contained within the bag.

A breech is usually of a plastic disposable cartridge case 3 covered with insulation 3' and complete with its igniter electrically linked to a device in the cockpit for manual or other activation. It holds a solid, combustible propellant 3" which, when activated, furnishes gases of combustion under pressure. This charge burns at a definite predetermined rate creating hot gases and high pressures. The gases pass through tubular connection 4 and turbine 5 covered with insulation 5' producing a constant speed at a constant horsepower. They then flow through the central core 6 of a jacket 7 past a check valve 8, being cooled as will be explained below. They flow through passage 9 into distributor 10 located between bag 2 and container 1 emerging from parts 11 to exert pressure on the outside of the bag.

Shaft 12 of turbine 5 is connected to pump 13 submerged in the water within the bag. Inlet pipe 14 allows water to flow thereinto from one or more openings 15, portion 16 of said inlet 14 surrounding turbine 5 to cool it, portion 17 thereof surrounding exhaust gas pipe 18 and passing through jacket 7 of core 6 to cool the exhaust gases to an acceptable temperature before the distribution of the gases to create a pressure head on the bag. The water then passes into the inlet side 19 of the pump, which is so designed as to avoid cavitation which would otherwise occur when the pressure at any point inside the pump drops below the vapor pressure of the water, causing the water to vaporize and to form cavities of vapor; whereby the pump has a high performance during the cycle. Expelling the exhaust gases into the space 20 outside the bag prevents burnt propellant particles from entering the pump and also possibly causing malfunctioning within the nozzle systems of the engine. It also serves the purpose of making the fire-inerting system independent of altitude since the water will always be held under pressure throughout the operating cycle.

A safety pressure valve 21 is provided for said space 20 to limit the permissible pressure.

Outlet 22 from pump 13 has check valve 24, continues at 25 through metering valve 26 and out through exit 27 to the engine, in this instance to the compressor thereof. Said valve 26 has an impeller 28 operating on threaded shaft 29 which is so set that after a certain gallonage flow it has travelled from right to left to close port 30, shutting off all flow through the high flow lines 23, 25. The time of flow of the water may be adjusted by changing shims on said shaft 29. After valve 26 closes the flow of water, it is diverted through conduit 31 past check valve 32 and back to inlet 19 of the pump, from which it is recirculated. A small capacity by-pass 33 from outlet 23 terminates in an injector nozzle 34 injecting a small stream of water into passage 9, to assist in cooling said gases.

Usually it is desirable that inerting water be applied to other elements of the engine, such as the turbine. Therefore, a part of the water is diverted from the main flow and the pressure of the diverted water is reduced from the pressure of the main flow. To accomplish this, a branch 35 from outlet 25 has a restricted opening or entrance 36 so that the water volume is restricted, the water passing through check valve 37 and branch 35 to exit 38 and into another piece of equipment, in this case the turbine.

In addition to the cooling of the combustion gases at points 18, 6 and 34, means are provided for flooding the breach 3 and turbine 5 for inerting purposes. A by-pass 40 having check valve 41 leads at 42 into connection 4 adjacent to breach 3. When the force of the combustion gases is in effect, check valve 41 is held closed so that no water can enter the by-pass. When the force is expended, the greater pressure of the water flowing through inlet 14 opens valve 41 and floods connection 4 and the blades of turbine 5.

The present system also contemplates the provision of a fluid like "Freon" which is correlated in its action with the above described elements. From an outside source 43, the fluid enters bag 2 through pipe 44 and enters cylinder 45 at a point intermediate its ends. One end 46 of said cylinder has duct 47 connected thereto and adapted to carry combustion gases from connection 4 to the cylinder. Piston 48 adjacent said end has a seat 49 adapted to contact plug 50 leaving area 51 which in a certain position will permit flow of said fluid into the cylinder. Remote end 52 of cylinder 45 has a flow circuit 53 provided with check valve 54 and entering pipe 44 at point 55.

From a point in the cylinder between end 46 and entrance of pipe 44 is an exhaust tube 56 for said fluid, which passes through regulating valve 57 and through duct 58, past check valve 59 and into branch 35 through duct 60. Regulating valve 57 is the means for regulating the flow of said fluid into the low flow branch 35 after all of the water has been pumped out of the bag. It is usually a piston-type pressure regulated device with a check valve and operating from the fluid source 43 and breech gases in duct 47; thereby said fluid flows through tube 58 into branch 35 without flow interruption as soon as the fluid pressure over-balances the water pressure and opens check valve 59. The rate and duration of fluid flow may be altered by adjustment of valve 57.

Figure 2:
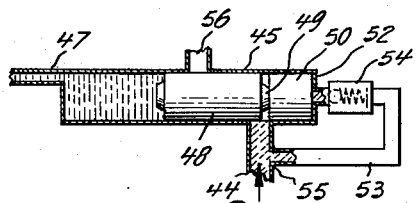
FIG. 2 is a diagrammatic view of the control valve for the fire extinguishing fluid after the propellant has been ignited.
Figure 3:
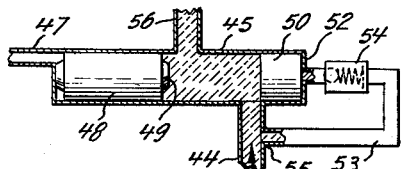
FIG. 3 is a view similar to that of FIG. 2 after the propellant has been consumed and the fluid has begun to flow.

In the operation of the fluid flow system, the several elements are initially in the positions shown in FIG. 1. When the charge is exploded, the exhaust gases exert pressure through duct 47, moving plug 50 and piston 48 to remote end 52 with area 51 communicating with pipe 44 as shown in FIG. 2. When the pressure of said gases is expended, the greater pressure of said fluid moves piston 48 to the left while plug 50 remains at the remote end. This opens a passage through the cylinder to tube 56, as seen in FIG. 3. When the fluid pressure becomes greater than the water pressure in branch 35, the fluid will pass therethrough and into the engine turbine.

Many advantages are inherent in the new fire-inerting system. It is light in weight and does not unduly add to the load on the aircraft. Because the shape can be drastically changed without any resulting disadvantages, the system may be placed in areas which would otherwise be unoccupied. The action is precise, rapid and highly effective, and it is not subject to accidental activation. No external power is needed and the cycle is automatic once the system is activated.

The device is safe in that the entire unit is contained in the water tank, the breech is shrouded by insulation and water, the turbine is jacketed by water, the exhaust gases are water cooled, and said gases are confined within the closed tank. The mechanical stresses in the system are kept to a minimum. Light weight is achieved by the use of light metals and by the elimination of the use of heavy cylinders for compressed inert gas. The several elements within the tank may be placed in various relative positions to fit into the metal tank whatever its shape may be.

One of the most important features of the present invention is that unlike prior systems using compressed firefighting fluids, the fire inerting system as disclosed herein has no pressure developed in it when it is not operating and when it is operating, the pressures are of the order of a few pounds per square inch. Cylinders of compressed gases usually run in the neighborhood of 700 to 800 pounds per square inch and constitute a constant danger to the occupants of the aircraft carrying such a device. With pressures of this nature, such a cylinder is analogous to a loaded bomb which may go off if there is a flaw in the metal or a weakness in the structure. In addition, the high pressure requires the use of heavy gauge stainless steel and this adds very materially to the weight of the aircraft.

In addition, the high pressure dictates a cylindrical shape for the container of the fluid and space requirements are usually such that no space of that particular shape is available in or around the engine nacelle. Usually an airplane engine is not designed around a fire inerting cylinder and consequently the inerting apparatus must be fitted into whatever angles or odd shapes may be available. The high pressure system is absolutely inflexible in this regard and must have a certain shaped volume in order to be installed.

On the other hand, the fire inerting system as claimed herein is completely flexible as to shape and position of elements and can be fitted into many odd and peculiar shapes of available volume. This is possible because at no time is there any pressure greater than very few pounds per square inch generated in this system, and consequently there is no need for a heavy, rigid pressure-tight vessel. In fact, it has been found that an extremely light gauge aluminum sheeting is satisfactory for use in this device.

While the device is inactive, it is completely "dead"; that is, contains no pressurized elements or materials which could possibly endanger any portion of the airplane or the occupants thereof. During the course of this operation, it generates no more than 5 pounds per square inch pressure and usually substantially lower than that amount. Satisfactory results have been achieved with as little as one-half pound per square inch pressure.

Although in the embodiment of this invention actually described and illustrated, the Freon valve which comprises pipe 44, cylinder 45, duct 47 and the associated elements, are shown to be positioned within the tank, this is by no means necessary as the assembly may be outside the tank or partly within and partly without as the space requirements and needs of the individual situation dictate.

These and other changes may be made in this device without departing from the scope and spirit thereof and this invention is to be broadly construed and not to be limited except by the character of the claims appended hereto.

What is claimed is:

1. A fire-inerting system for jet engines and other apparatus comprising a closed container, a flexible bag within said container, a breech containing a propellant charge in said bag, a pump in said bag, a power source connected to said pump, a connection to said power source from said breech to supply gases for causing operation of said pump by said gases generated from said propellant charge, said bag containing a fire-inerting liquid, an outlet from said pump to said apparatus to be fire-inerted, an inlet conduit to said pump communicating with said liquid in said bag.

2. A fire-inerting system for jet engines and other apparatus comprising a closed container, a flexible bag within said container, a breech containing a propellant charge in said bag, a pump in said bag, a power source connected to said pump, a connection to said power source from said breech to supply gases for causing operation of said pump by said gases generated from said propellant charge, said bag containing a fire-inerting liquid, an outlet from said pump to said apparatus to be fire-inerted, an inlet conduit to said pump communicating with said liquid in said bag, and a passage from said breech to a point between said bag and container whereby a head is placed on said liquid.

3. A fire-inerting system for jet engines and other apparatus comprising a closed container, a flexible bag within said container, a breech containing a propellant charge in said bag, a pump in said bag, a power source connected to said pump, a connection to said power source from said breech to supply gases for causing operation of said pump by said gases generated from said propellant charge, said bag containing a fire-inerting liquid, an outlet from said pump to said apparatus to be fire-inerted, an inlet conduit to said pump communicating with said liquid in said bag, and a passage from said breech to a point between said bag and container whereby a head is placed on said liquid, said passage being surrounded by said liquid.

4. A fire-inerting system as set forth in claim 1 in which there is a turbine operable by said gases operatively attached to said pump.

5. A fire-inerting system as set forth in claim 1 in which a time metering valve is interposed between said outlet and said apparatus to cut off fluid flow in a predetermined time.

6. A fire-inerting system as set forth in claim 1 in which a time metering valve is interposed between said outlet and said apparatus to cut off fluid flow in a predetermined time, a connection from said outlet within said bag to said inlet conduit having a check valve adapted to open when said valve is closed.

7. A fire-inerting system as set forth in claim 2 in which a connection between said outlet and said passage is adapted to inject liquid into said gases in the direction of flow of said gases.

8. A fire-inerting system as set forth in claim 1 in which said liquid is essentially water.

9. A fire-inerting system as set forth in claim 4 in which said inlet conduit surrounds said turbine to cool the same.

10. A fire-inerting system as set forth in claim 4 in which said inlet conduit has a by-pass communicating with said breech connection and valve means in said by-pass to prevent liquid from said inlet conduit from entering said breech.

11. A fire-inerting system as set forth in claim 4 in which said inlet has a by-pass communicating with said breech connection, and a check valve in said by-pass adapted to be opened by said liquid head when said gas pressure is depleted.

12. A fire-inerting system for jet engines and other apparatus comprising a closed container, a flexible bag within said container, a breech containing a propellant charge in said bag, a pump in said bag, a power source connected to said pump, a connection to said power source from said breech to supply gases for causing operation of said pump by said gases generated from said propellant charge, said bag containing a fire-inerting liquid, an outlet from said pump to said apparatus to be fire-inerted, an inlet conduit to said pump communicating with said liquid in said bag, a branch in said outlet communicating with equipment to be fire-inerted.

13. A fire-inerting system according to claim 12 in which the entrance to said branch is restricted to a predetermined quantity of flow which is less than that through said outlet.

14. A fire-inerting system according to claim 12 in which the entrance to said branch is restricted to a predetermined quantity of flow which is less than that through said outlet, a source of fire-extinguishing fluid under pressure, and a check valve in said entrance to close said branch to reverse flow of high pressure fire extinguishing liquid from said branch through said restricted entrance, and a duct for supplying said liquid to said branch and a pipe to provide communication between said source and said check valve.

15. A fire-inerting system for jet engines and other apparatus comprising a closed container, a flexible bag within said container, a breech containing a propellant charge in said bag, a pump in said bag, a power source connected to said pump, a connection to said power source from said breech to supply gases for causing operation of said pump by said gases generated from said propellant charge, said bag containing a fire-inerting liquid, an outlet from said pump to said apparatus to be fire-inerted, an inlet conduit to said pump communicating with said liquid in said bag, a branch in said outlet communicating with equipment to fire-inerted.

16. A fire-inerting system for jet engines and other apparatus comprising a closed container, a flexible bag within said container, a breech containing a propellant charge in said bag, a pump in said bag, a power source connected to said pump, a connection to said power source from said breech to supply gases for causing operation of said pump by said gases generated from said propellant charge, said bag containing a fire-inerting liquid, an outlet from said pump to said apparatus to be fire-inerted, an inlet conduit to said pump communicating with said liquid, a source of a fire-extinguishing fluid under pressure, a pipe for leading said fluid into said bag, a cylinder, said pipe connected to said cylinder, a piston in said cylinder, a duct from said connection to said cylinder, and an exhaust tube from said cylinder intermediate said pipe and said duct, the position of said exhaust tube being such that said piston prevents gases from said connection from entering said exhaust tube.

17. A fire-inerting system according to claim 16 in which said exhaust tube is in communication with a branch of said outlet leading to equipment to be fire-inerted.

18. A fire-inerting system according to claim 16 in which said exhaust tube is in communication with a branch of said outlet leading to equipment to be fire-inerted, and a check valve in said exhaust tube to prevent said liquid from entering said tube.

19. A fire-inerting system according to claim 16 in which said duct is at one end of said cylinder, said pipe is near the other end, and said tube is at an intermediate point.

20. A fire-inerting system according to claim 16 in which said duct is at one end of said cylinder, said pipe is near the other end, and said tube is at an intermediate point, a plug in said cylinder remote from said duct and adapted to fit into the end remote from said duct to uncover the point of entering of said pipe into said cylinder.

21. A fire-inerting system according to claim 16 in which said duct is at one end of said cylinder, said pipe is near the other end, and said tube is at an intermediate point, a plug in said cylinder remote from said duct and adapted to fit into the end remote from said duct to uncover the point of entering of said pipe into said cylinder, there being a space between said piston and plug when both are at said remote end, said space being in line with said point of entering of said pipe and said piston covering said tube.

22. A fire-inerting system according to claim 16 in which said duct is at one end of said cylinder, said pipe is near the other end, and said tube is at an intermediate point, a plug in said cylinder remote from said duct and adapted to fit into the end remote from said duct to uncover the point of entering of said pipe into said cylinder, a circuit from said remote end to said pipe, adapted to release back-pressure in said remote end and permit said plug to move into said end.

23. A fire-inerting system according to claim 16 in which a pressure regulating valve is in said tube.

24. A fire-inerting system according to claim 1 in which said liquid is a water solution of lithium chloride.

25. A fire-inerting system according to claim 24 wherein said solution comprises about 24% lithium chloride.

26. A fire-inerting system according to claim 4 in which said breech and said turbine are covered with insulating material.

27. A fire-inerting system according to claim 1 wherein said container is provided with a pressure relief valve.

No references cited.